US007267752B2

(12) United States Patent
King et al.

(10) Patent No.: US 7,267,752 B2
(45) Date of Patent: Sep. 11, 2007

(54) RAPID FLOW FRACTIONATION OF PARTICLES COMBINING LIQUID AND PARTICULATE DIELECTROPHORESIS

(75) Inventors: Michael R. King, Rochester, NY (US); Oleg Lomakin, Pittsford, NY (US); Thomas B. Jones, Rochester, NY (US); Rajib Ahmed, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 11/189,123

(22) Filed: Jul. 26, 2005

(65) Prior Publication Data

US 2006/0108224 A1 May 25, 2006

Related U.S. Application Data

(60) Provisional application No. 60/591,587, filed on Jul. 28, 2004.

(51) Int. Cl.
*G01N 27/447* (2006.01)

(52) U.S. Cl. ........................................ 204/547; 204/643

(58) Field of Classification Search ................ 204/547, 204/643

See application file for complete search history.

(56) References Cited

U.S. PATENT DOCUMENTS 4,326,934 A * 4/1982 Pohl ........................... 204/547
6,641,708 B1 * 11/2003 Becker et al. .............. 204/547
6,766,817 B2 7/2004 da Silva
7,029,564 B1 * 4/2006 Lock et al. ................. 204/643
7,105,081 B2 * 9/2006 Gascoyne et al. .......... 204/547

OTHER PUBLICATIONS

Jones et al. ("Dielectrophoretic liquid actuation and nanodroplet formation," Journal of Applied Physics, vol. 89, No. 2, 15 Jan. 2001).*

Pohl et al. ("The Continuous Positive and Negative Dielectrophoresis of Microorganisms," J. Biol. Phys. vol. 9, 1981, p. 67-86).*

M. R. King, et al., "Size-Selective Deposition of Particles Combining Liquid and Particulate Dielectrophoresis", Journal of Applied Physics, 97, 054902 (2005).

* cited by examiner

*Primary Examiner*—Alex Noguerola
(74) *Attorney, Agent, or Firm*—Blank Rome LLP

(57) ABSTRACT

Rapid, size-based, deposition of particles from liquid suspension is accomplished using a nonuniform electric field created by coplanar microelectrode strips patterned on an insulating substrate. The scheme uses the dielectrophoretic force both to distribute aqueous liquid containing particles and, simultaneously, to separate the particles. Size-based separation is found within nanoliter droplets formed along the structure after voltage removal. Bioparticles or macromolecules of similar size can also be separated based on subtle differences in dielectric property, by controlling the frequency of the AC current supplied to the electrodes.

19 Claims, 4 Drawing Sheets bright field image fluorescent image

RAPID FLOW FRACTIONATION OF PARTICLES COMBINING LIQUID AND PARTICULATE DIELECTROPHORESIS

REFERENCE TO RELATED APPLICATION

The present application claims the benefit of U.S. Provisional Patent Application No. 60/591,587, filed Jul. 28, 2004, whose disclosure is hereby incorporated by reference in its entirety into the present disclosure.

STATEMENT OF GOVERNMENT INTEREST

The work leading to the present invention was supported by grants from the National Institutes of Health (NIH Grant No. RR16083), the National Science Foundation (NSF Grant No. ECS-0323429), and the Infotonics Technology Center, Inc. (NASA Grant No. NAG3-2744). The government has certain rights in the invention.

FIELD OF THE INVENTION

The present invention is directed to the size and/or dielectric separation of particles and more particularly to a technique for size-selective and/or dielectric-sensitive separation of particles which combines liquid and particulate dielectrophoresis.

DESCRIPTION OF RELATED ART

Many schemes exploiting electrostatic forces in practical implementations of the laboratory-on-a-chip are now under investigation. Ranging widely in form, the concepts fit loosely into two categories: (i) microfluidic plumbing systems, intended for movement, manipulation, and dispensing of liquid samples; and (ii) particle control schemes, for collecting, separating, positioning, and characterizing suspended biological cells, organelles, or macromolecules.

Nonuniform ac electric fields imposed by planar electrodes patterned on an insulating substrate and coated with a thin, dielectric layer can be used to manipulate, transport, dispense, and mix small samples of aqueous liquids. That scheme, called dielectrophoretic (DEP) liquid actuation, exploits the ponderomotive force exerted on all dielectric media by a nonuniform electric field. It is closely related to electrowetting on dielectric-coated electrodes (known as EWOD). In fact, EWOD and DEP liquid actuation are, respectively, the low- and high-frequency limits of the electromechanical response of aqueous liquid masses to a nonuniform electric field.

DEP-based field flow fractionation (FFF) typically uses an upward-directed (negative) DEP force effectively to levitate the particles. It has been used to separate latex microspheres and blood cells.

In FFF, particles dispersed in a liquid flow are subjected to a controllable transverse force field. Typically, this force field distributes the particles at varying heights above a surface, thereby placing them on faster or slower-moving streamlines in the flow field. Each particle seeks its equilibrium, dependent on its individual properties, at the height where the applied force balances sedimentation, and then is swept along at the velocity of the fluid corresponding to that height. Thus, an initially homogeneous mixture will fractionate; particles carried along by the flow at different rates will emerge at the outlet at different times.

SUMMARY OF THE INVENTION

There are clear functional advantages when fluidic and particulate control can be combined in one microsystem.

The present invention uses a very simple electrode structure that dispenses nanoliter aqueous droplets starting from an initial microliter-sized sample and, simultaneously, performs size-based separation of submicron particles suspended in the liquid. The technique can also be applied to nanometer-sized proteins and DNA molecules. The transient actuation and separation processes take place within ~100 ms.

High frequency is used, so that the electric field can permeate the liquid and exert the desired DEP force on the suspended particles. At the lower frequencies used for electrowetting, this force cannot be exploited because the electric field is blocked from the interior of the liquid if the electrodes are dielectric coated.

The present invention is similar to FFF, but differs in that it is transient and nonequilibrium. Particles suspended in the parent drop are drawn into the finger and swept rapidly along by the liquid, while at the same time being attracted toward the strip electrodes by a downward-directed, positive DEP force. Rather than remaining suspended at a constant equilibrium height as in conventional FFF, particles in DEP microactuation follow essentially curved trajectories. Gravity plays no role; the time for a 1 μm latex bead to settle a distance of 30 μm, a distance comparable to the height of a liquid finger, is $\sim 10^3$ s, while the transient finger motion requires only $\sim 10^{-1}$ s. Macromolecules settle at even slower rates.

It has been demonstrated that the DEP effect can be harnessed to move and dispense small volumes of liquid containing suspensions of particles in the submicron or nanometer range and that these particles can be simultaneously separated based on their size or dielectric properties. The separation occurs because the downward-directed, positive DEP force imposed by the nonuniform electric field within the liquid attracts the larger particles more strongly, leaving the smaller particles to be swept further along in the shear flow of the finger. Using two-color fluorescence microscopy, the separation of two size cuts of polystyrene beads, viz, 0.53 and 0.93 μm diameter, is easily discerned. The process is rapid, usually requiring $\sim 10^2$ ms for a structure 6 mm in length.

A simple model is presented for the separation scheme, and simulations performed with this model correlate best to the experimental data using $\mathrm{Re}[\underline{K}(\omega)] \sim 0.5$ (as will be explained in detail below), which is slightly below the expected range of 0.8-1.0. The use of frequency as a control parameter for transient particle separation may facilitate gradient deposition of particles within monodisperse populations based on medically important attributes.

One use envisioned is in situ surface array sensitization on a substrate, that is, exploiting DEP liquid actuation to distribute functionalized particles (such as colloidal Au) that subsequently attach to droplet-forming electrode structures described elsewhere. The flow generated deposition automatically creates a smooth particle concentration gradient of functionalized spots useful for gradient-sensitive chemical assays in the laboratory-on-a-chip.

The present invention has utility in any laboratory-on-a-chip application. In particular, the particles to be separated can be cells, organelles, proteins, DNA, RNA, or combinations thereof. If the particles are labeled, the labels can be dyes, biotin, fluorescent molecules, radioactive molecules, chromogenic substrates, chemiluminescent labels, enzymes, and combinations thereof.

The invention is described in the following article, whose disclosure is hereby incorporated by reference in its entirety into the present disclosure: M. R. King et al, "Size-selective deposition of particles combining liquid and particulate dielectrophoresis," *Journal of Applied Physics,* 97, 054902 (2005).

BRIEF DESCRIPTION OF THE DRAWINGS

A preferred embodiment of the present invention will be disclosed with reference to the drawings, in which.

DETAILED DESCRIPTION OF THE PREFERRED EMBODIMENT

Figures 1A, 1B, 1C:
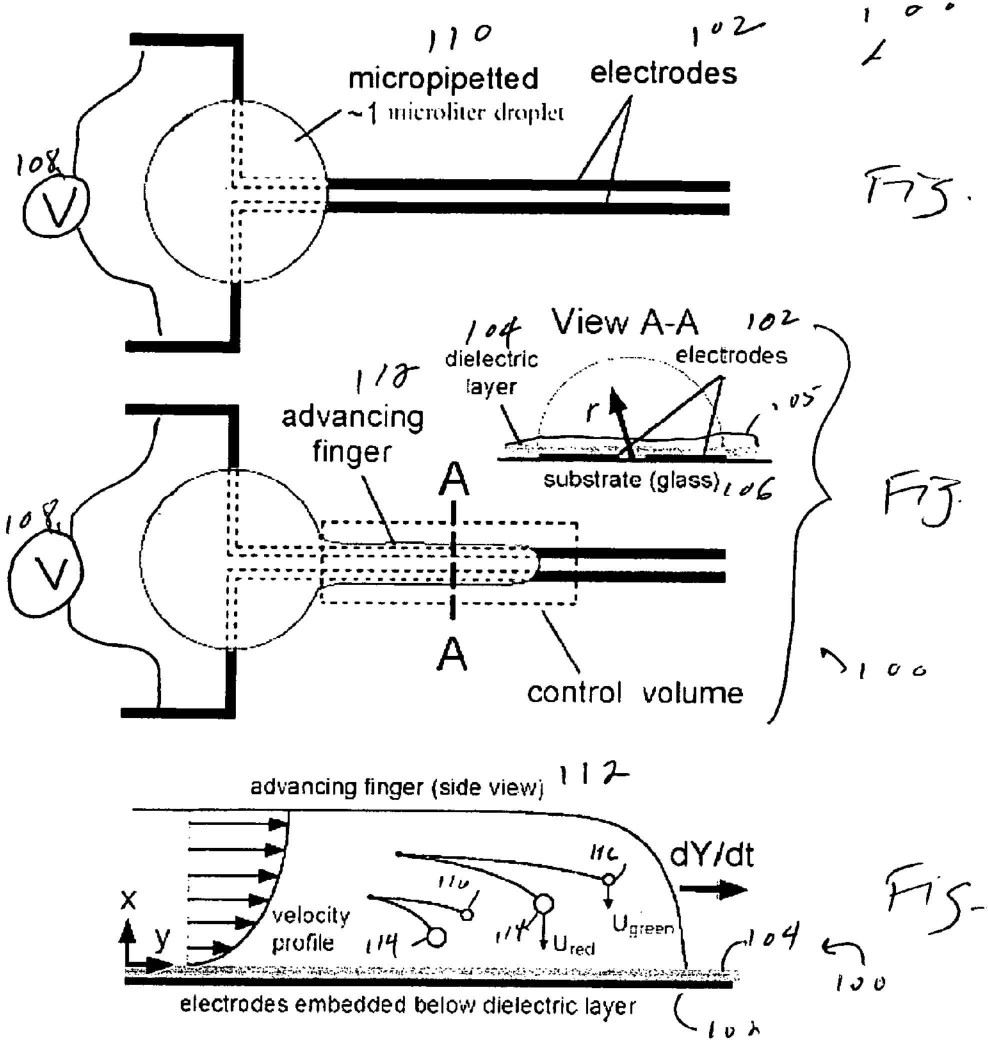
FIGS. 1A-1C show a pair of electrodes in which the preferred embodiment can be implemented.

A preferred embodiment will be set forth in detail with reference to the drawings, in which like reference numerals refer to like elements throughout.

FIG. 1A shows the planar electrode structure 100 used in the experiments. The parallel electrode strips 102, patterned in 2 kÅ thick Al evaporatively deposited on borosilicate glass substrates 106, were of width w=20 μm, separation g=20 μm, and length=6 mm. These structures were spin-coated, first with ~2 μm of SU-8™, an epoxy-based, dielectric material, to form a dielectric layer 104, and then with ~0.5 μm of photoresist 105 (Shipley 1805) to control wetting. The electrodes 102 are connected to a voltage source 108.

To facilitate quantitative investigation of the separation effect, we suspended fluorescent-labeled, polystyrene microspheres (0.53 and 0.93 μm diameter, 0.06% by volume; Bangs Labs, Fishers, Ind.) in deionized water, adding nonionic surfactant to prevent particle aggregation (Tween 20, 0.1%-0.5% by volume). Prior to each experiment, the —COOH surface groups of the microspheres were covalently coupled to ethanolamine using a single step reaction, rendering the beads uncharged and hydrophilic. The ethanol layer on the particle surface acts to reduce the hydrophobic nature of the polystyrene beads, although not completely, as discussed below. In all experiments, the substrates were mounted horizontally and covered by a few millimeters of oil—typically, embryo-safe mineral oil (Sigma)—to minimize wetting stiction and hysteresis. The oil provided the added benefit of eliminating evaporation.

Figure 2:
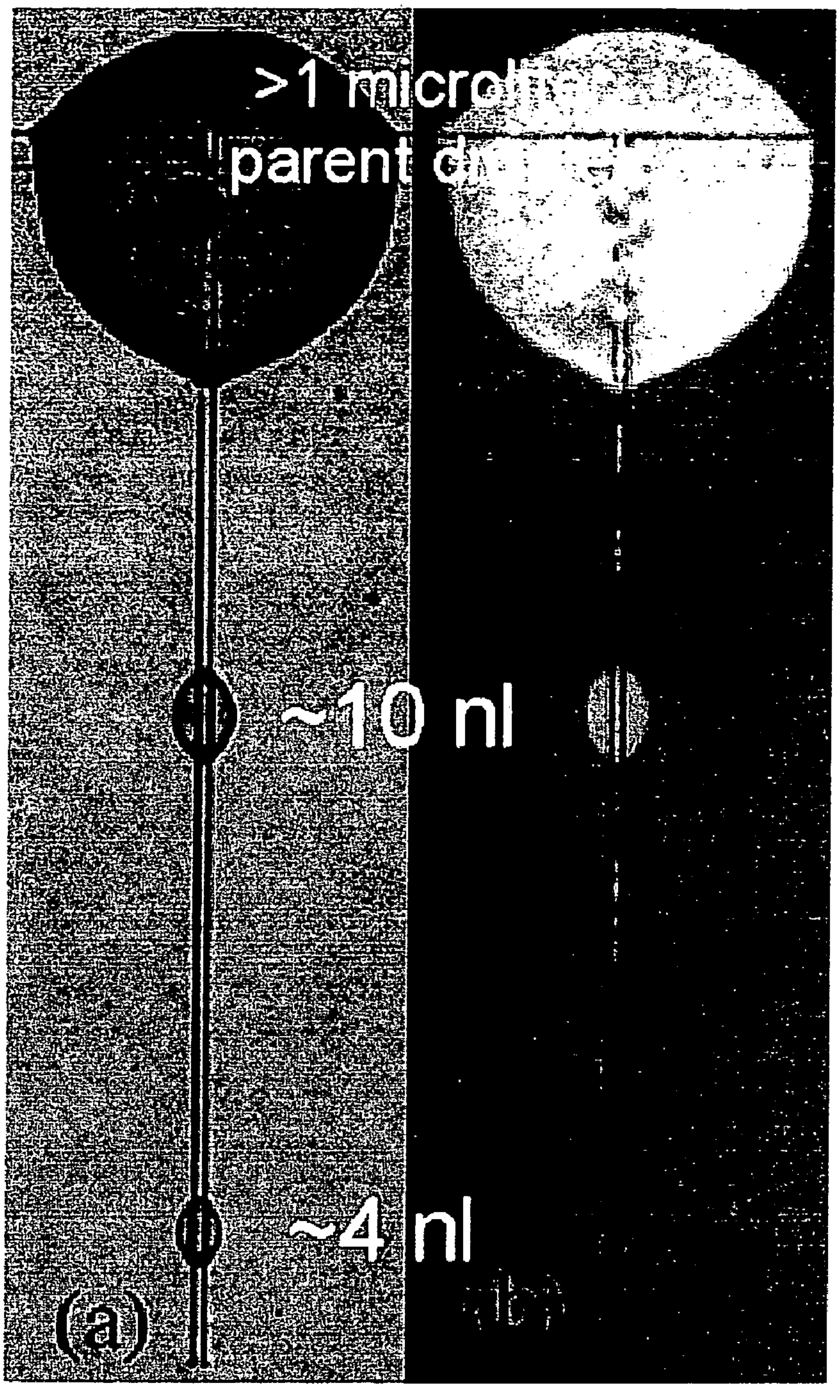
FIG. 2 shows bright field and fluorescent images of the transport of droplets along the electrodes of FIGS. 1A-1C.

Initial experiments were performed with monodisperse suspensions of 0.53 μm particles. To prepare for each experiment, a ~1 μl parent droplet 110 of the test liquid was dispensed from a micropipette at one end of the structure (FIG. 1A and top of FIG. 2). Then, 250 V rms at 100 kHz was applied for less than 1 s, causing a finger 112 to protrude from the sessile droplet 110 and to move rapidly along the electrodes 102 to the opposite end, as depicted in FIG. 1B. When voltage was removed, capillary instability very rapidly broke up the finger into droplets distributed along the electrodes (not shown in FIGS. 1A-1C, but visible in FIG. 2). The number of daughter drops produced by rupture of the finger is related to the interfacial tension. Directly following each experiment, the substrates were imaged on an inverted, fluorescence microscope (Olympus IX81; Olympus America, Inc., Melville, N.Y.) equipped with a high-resolution, cooled charge-coupled device (CCD) camera (Sensicam QE; Cooke Corp., Auburn Hills, Mich.). The bright field image of the left side of FIG. 2 shows that two droplets formed having volumes ~10 and ~4 nl, respectively. The right side of FIG. 2, a fluorescent image of the same scene, reveals that the ~4 nl droplet, further from the parent droplet, has a bead concentration manifestly lower than the closer, ~10 nl droplet. Some plating out on the electrodes between the droplets is evident, indicating that the particles retain some hydrophobic property by adhering to the electrodes on contact with them due to nonspecific adhesion.

Figures 3A, 3B, 3C:
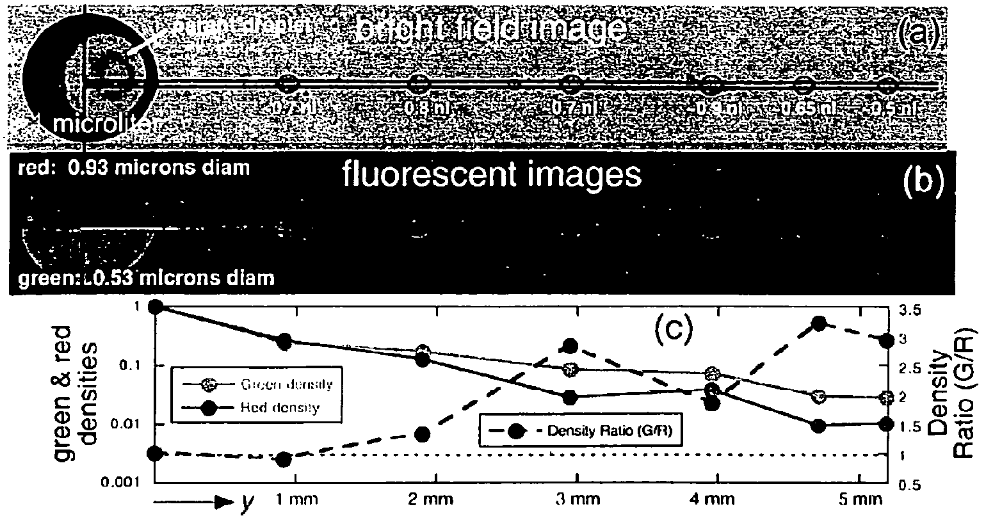
FIGS. 3A-3C show experimental data of particle separation.

This indication of particle separation along the length of the structure encouraged us to conduct additional experiments using suspensions containing equal parts by volume (0.03% for each) of 0.53 and 0.93 μm beads to determine if size-based separation could be achieved. To facilitate simultaneous measurement of the two subpopulations, the smaller beads 116 were labeled with Dragon Green dye (excitation/emission=480/520 nm; Bangs Labs, Fishers, Ind.) and the larger beads 114 with Flash Red dye (660/690 nm; Bangs Labs). The result of one experiment is shown in FIGS. 3A-3C. The bright field image in FIG. 3A shows six fairly uniform droplets (plus one small satellite, which was ignored). FIG. 3B shows another image of the same scene, created by splicing together opposite halves of the red and green fluorescent photomicrographs. From the split image, it is readily apparent that the green (smaller) particles were transported further along the structure by DEP-actuated flow. This visual impression is borne out by optical density data plotted in FIG. 3C, directly beneath the fluorescent composite image. These data, indicating average green and red densities within each droplet, were obtained from integration of the fluorescent intensities and division by the image areas of each droplet. The plotted color intensity values were normalized with respect to their corresponding average intensities of the parent droplet, and the local background intensity measured between daughter droplets was subtracted out. Because the particle suspensions are very dilute (<<1%), it is justified to assume that the integrated fluorescence intensities are linearly proportional to the total number of beads contained within each droplet, and thus provide an accurate measure of local particle concentrations. Moving away from the parent droplet, the absolute densities of both size cuts drop almost monotonically, with the density of the larger (red) particles decreasing more rapidly. The green/red density ratio, 1:1 in the test solution, has reached ~3:1 for the sixth droplet, situated ~5 mm from the edge of the parent droplet.

To investigate the mechanisms at work in the transient DEP particle separation scheme, we developed a simple model for the process and then used a simulation methodology with a single adjustable parameter related to the particle polarizability for comparison to the concentration data plotted in FIG. 3C.

Particles swept along in the z direction by the rapidly moving finger experience a transverse (downward-directed) DEP force induced by the nonuniform electric field created by the parallel electrodes. This force, acting primarily in the radial r direction as depicted in the cross section of FIG. 1B, may be expressed in standard form as $$F_{DEP,r} = 2\pi\epsilon_m R^3 \, Re[\underline{K}] \, \partial E^2/\partial r. \qquad (1)$$

In Eq. (1), R is particle radius, $\epsilon_m$ is permittivity of the suspension medium, E(x) is magnitude of the transverse electric field, and $\underline{K}$ is the complex, frequency-dependent Clausius-Mossotti factor.

$$\underline{K}(\omega) = \frac{\underline{\varepsilon}_p - \underline{\varepsilon}_m}{\underline{\varepsilon}_p + 2\underline{\varepsilon}_m}, \quad (2)$$

where $\underline{\epsilon}_p$ is the complex permittivity of the particle, $\underline{\epsilon}_m = \epsilon_m 1/j\omega\sigma_m$ is the complex permittivity of the liquid medium, ω is the ac electric field frequency in rad/s, and $\sigma_m$ is the electrical conductivity. The sign of Re[$\underline{K}$] determines the direction of the DEP force: for Re[$\underline{K}$]>0 (positive DEP), particles are attracted toward the gap between the electrodes where the electric field is strongest, while for Re[$\underline{K}$]<0 (negative DEP), particles are repelled. Thus, from Eqs. (1) and (2) it is evident that even a mixture of bioparticles or macromolecules that are of equal size may be separated based on subtle differences in $\epsilon_p$.

While values for $\epsilon_m$ and $\sigma_m$ are generally known, or readily measurable, $\underline{\epsilon}_p$ is more difficult to characterize for submicron polystyrene beads in aqueous suspension due to imperfect knowledge of interfacial conditions. One may exploit the condition $-0.5 \leqq \text{Re}[\underline{K}] \leqq 1.0$ to establish firm upper and lower limits for the DEP force magnitude. The approach herein is to treat Re[$\underline{K}$] as the adjustable parameter in simulations based on the model, using the experimental data to establish an estimate for this quantity. We then compare this estimate to values reported in prior investigations with comparable particles.

Because of the high dielectric constant of the water, $\kappa_m$~80, interior electric field lines near the curved upper boundary of the liquid finger are constrained to be circular arcs. Thus, the nonuniform field is essentially azimuthal, and its spatial nonuniformity may be approximated by an inverse dependence on the radial distance r measured from an imaginary axis running along the surface midway between and parallel to the electrodes.

$$E_\phi(r) \approx V/\pi r; \quad (3)$$

where $V_{finger}$ is the voltage drop that occurs within the finger, which is less than the applied voltage V because of capacitive voltage division.

$$V_{finger} \approx \frac{C_d}{2C_m + C_d} V, \quad (4)$$

where $C_d = \kappa_d \epsilon_0 w/d$, $C_{air} = \epsilon_0 K(1-\zeta)/K(\zeta)$, and $C_m = \kappa_m C_{air}$ are, respectively, the per unit length capacitances of the dielectric layer, the coplanar electrode structure in air, and the same structure with the water finger present. K is the complete elliptic integral with argument $\zeta \equiv g/2(w+g/2)$. Combining Eqs. (3) and (1) gives the DEP force on the particles.

$$F_{DEP,r} = \frac{4\varepsilon_m R^3 \text{Re}[\underline{K}]}{\pi r^3} V_{finger}^2. \quad (5)$$

This force exhibits rather strong inverse dependence on r. For particles close to the axis, 0<r<g/2, Eq. (3) suffers from inaccuracy; however, the separation process is dominated by the behavior in regions where particles move slowest, that is, where the field gradient is weakest. Thus, we anticipate that the inaccuracy of Eq. (3) close to the axis will have limited overall influence on the predictions of the model.

As the liquid sweeps particles along the structure in the y direction, the DEP force simultaneously attracts them toward the gap between the electrodes. Opposing this force is the Stokes drag.

$$F_{drag,r} = -6\pi\mu_m R U_r, \quad (6)$$

where $\mu_m$ is the liquid viscosity and $U_r$ is the radial component of particle velocity. As particles drift closer to the electrodes, they encounter a steadily stronger DEP force and, simultaneously, slower moving liquid. Equating Eqs. (5) and (6) reveals a strongly size-dependent radial drift, $$U_r = \frac{2\varepsilon_m R^2 \text{Re}[\underline{K}]}{3\pi^2 \mu_m r^3} \left( \frac{C_d}{2C_m + C_d} V \right)^2. \quad (7)$$

As stated previously, for two or more bioparticle types with equal radius but different dielectric property (Clausius-Mossotti factor) $\underline{K}$, Eq. (7) shows a dielectric-dependent radial drift.

Because $U_r$, the Stokes velocity, is proportional to $R^2$, on average the larger beads are drawn preferentially toward the electrode surface, where the liquid is slower moving. The smaller particles, remaining more evenly distributed throughout the cross section of the finger, travel further on average, and collect preferentially in daughter droplets formed further from the parent. This nonequilibrium FFF mechanism is responsible for the size-based separation evident in FIG. 3C.

The simulation requires a model for the transient dynamics of the finger. The methods of lumped parameter electromechanics based on variable capacitance provide an attractive way to predict the net force of electrical origin on the liquid mass. We write the momentum conservation equation for a control volume containing the entire lengthening finger as shown in FIG. 1B.

$$\frac{d}{dt}\left(\rho_m A_x Y \frac{dY}{dt}\right) = f^e + f_{drag} + f_{st}, \quad (8)$$

where $\rho_m$ is the liquid density, $A_x \approx (\pi/2)(w+g/2)^2$ is the semicircular cross section of the finger, and Y(t) is the time-dependent finger length. The electromechanical force driving the finger is $$f^e = \frac{(\kappa_w - 1) C_d C_{air} V^2}{2(C_d + 2C_m)}, \quad (9)$$

where $\kappa_w$ is the dielectric constant of the water and V is the rms voltage.

The drag force in Eq. (8) may be expressed as $$f_{drag} = -P_{finger} Y(t) \tau_{drag}, \quad (10)$$

where $P_{finger}$ is the total perimeter of the finger, $\tau_{drag} = \mu_m \partial U_y / \zeta x$ is the shear stress, and $\mu_m$ is dynamic viscosity. The surface tension is approximated by $$f_{st} = -\gamma P_{finger}, \quad (11)$$

where γ is the interfacial tension.

On the time scale of interest for DEP actuation, that is, 0.01 s<t<1.0 s, momentum is safely neglected in Eq. (8), so that the dynamic equation for the finger becomes $$P_{finger}Y(t)\tau_{drag} \approx \frac{(\kappa_w - 1)C_d C_{air} V^2}{2(C_d + 2C_m)} - \gamma P_{finger}, \tag{12}$$

where $\tau_{drag} \propto dY/dt$ must be determined from the velocity profile within the liquid finger.

Consider the cross section of the liquid finger as shown in FIG. 1B, view A-A. The velocity profile for a half cylinder of fluid set in motion by a body force can be obtained by a conformal mapping transformation of the spatial coordinates. First, the transverse coordinates (x,z) are normalized by the height of the liquid finger $H=w+g/2$, i.e., $x'=x/H$ and $z'=z/H$. A circle defines the upper fluid interface: $(x')^2+(z')^2=H^2$. Then, the dimensionless coordinates are stretched by the hyperbolic sine and cosine so that the upper interface is defined by $$\frac{(x')^2}{\sinh(1)} + \frac{(z')^2}{\cosh(1)} = 1. \tag{13}$$

The result is a transformed coordinate system that admits a simple solution for the velocity profile. In the new coordinate system (u,v), related to the original coordinates by $v+ju=\sin(y+jx)$ with $j=\sqrt{-1}$, the original semicircular cross section becomes a rectangular domain $v\in[-\pi/2,+\pi/2]$, $u\in[0,1]$. The upper surface of the rectangular domain (u=1) corresponds to the curved upper free surface of the finger, while the sides and bottom map to its boundary on the substrate. The solution for a pressure or body-force driven flow of liquid through a rectangular conduit with a free (zero-shear) upper surface and no-slip conditions on the sides and bottom is $$U(v/u)=U_{max}u^2(v-\pi/2)^2. \tag{14}$$

The main features of the unidirectional velocity profile are that it reaches its maximum at the highest point of the finger and goes to zero on the substrate, x=0.

The desired velocity profile and the shear stress $\tau_{drag}$ in (x,z) coordinates are obtained through the coordinate transformation given above. The area-averaged fluid velocity was numerically determined to be $U_{avg}=dY/dt=0.2202U_{max}$. From scaling arguments, the average wall shear stress $\tau_{drag}$ is $$\tau_{drag} = \frac{2\mu}{w+g/2}\frac{dY/dt}{c}, \tag{15}$$

where c is an O(1) constant that depends on the details of the flow. Numerical integration of the velocity gradient at the wall using the detailed solution described above yields c=0.507.

When Eq. (15) is used in Eq. (12), the resulting differential equation can be solved analytically, $$Y(t) = A\sqrt{t}\text{, where } A = \sqrt{\frac{0.507(f^e + f_{st})(w+g/2)}{\mu(P_f + 2w + g)}}. \tag{16}$$

The $\sqrt{t}$ time dependence of the finger length is identical to certain thermocapillary driven flows. Note the scaling of finger growth time with respect to electrode structure length L:

$$T_f=L^2/A^2. \tag{17}$$

The model described above neglects the effect of Brownian particle diffusion, which for a 1 μm particle in water at 300 K is characterized by a diffusivity of 0.4 $\mu m^2/s$. Thus, this effect is expected to be too slow to influence the DEP-driven dynamics. It is possible that diffusion could have influenced our data nevertheless, since microscopic imaging was performed up to 2 h after experiments had been performed. However, because most of the particles have already been deposited or are contained within discrete droplets, we do not believe this to be important. Based on these estimates, Brownian motion should also not impede separation of nanometer-sized biomolecules, due to the relatively rapid speed of the finger growth.

The system of equations describing finger elongation and simultaneous particle motion was integrated numerically as an initial value problem with particles randomly distributed throughout the cross section and introduced into the flow at the inlet to the finger. The location of each particle, governed by Eq. (7), was tracked as a function of time. Steadily increasing time steps, corresponding to fixed discrete displacements of the leading edge of the finger, were implemented for computational efficiency:

$$dt_i = \left|\left(\frac{L_i}{A}\right)^2 - \left(\frac{L_{i-1}}{A}\right)^2\right|, \tag{18}$$

with a fixed spatial step size: $dL=L_i-L_{i-1}$. This variable time step approach facilitates fixing the number of beads introduced at each time step to be constant, corresponding to the requirement of uniform bead concentration in the parent droplet. The probability density of particles at the inlet to the finger must be correctly weighted with the fluid flux distribution in the axial (y) direction at the inlet (proportional to U(x,z;t) given above). We impose this constraint by generating a group of three random numbers (x',y',z') uniformly distributed between 0 and 1. If y'<U(x',z'), where U is the dimensionless fluid velocity, then x' and z' are used as the initial coordinates of the entering particle in the finger cross section. Groups of random numbers are generated until this test is satisfied for each new particle placement. Such a weighting properly distributes particles at the inlet (y=0) in accord with the assumption of a uniform distribution of particles within the feed droplet. In all numerical results shown, 1000 time steps and 1000 particles were used.

Polystyrene beads in aqueous solutions exhibit strong, frequency-dependent behavior in the form of a prominent relaxation process. At low frequencies, $\text{Re}[\underline{K}]\sim 1$, while at high frequencies, $\text{Re}[\underline{K}]\approx 0.50$. The key to estimating $\text{Re}[\underline{K}]$ is to have reliable information about the crossover frequency that divides these regions. For polystyrene beads in the 0.5-1.0 μm range suspended in aqueous media of electrical conductivity $\sigma \leqq 2\times10^{-3}$ S/m, the crossover frequency typically exceeds 1 MHz. Our medium conductivity probably did not exceed ~$10^{-3}$ S/m, so we may assume that our experiments, all performed using 100 kHz ac, were far below the crossover. Thus, we would expect that $0.8 \leqq \mathrm{Re}[\underline{K}] \leqq 1.0$.

Figures 4A, 4B, 4C:
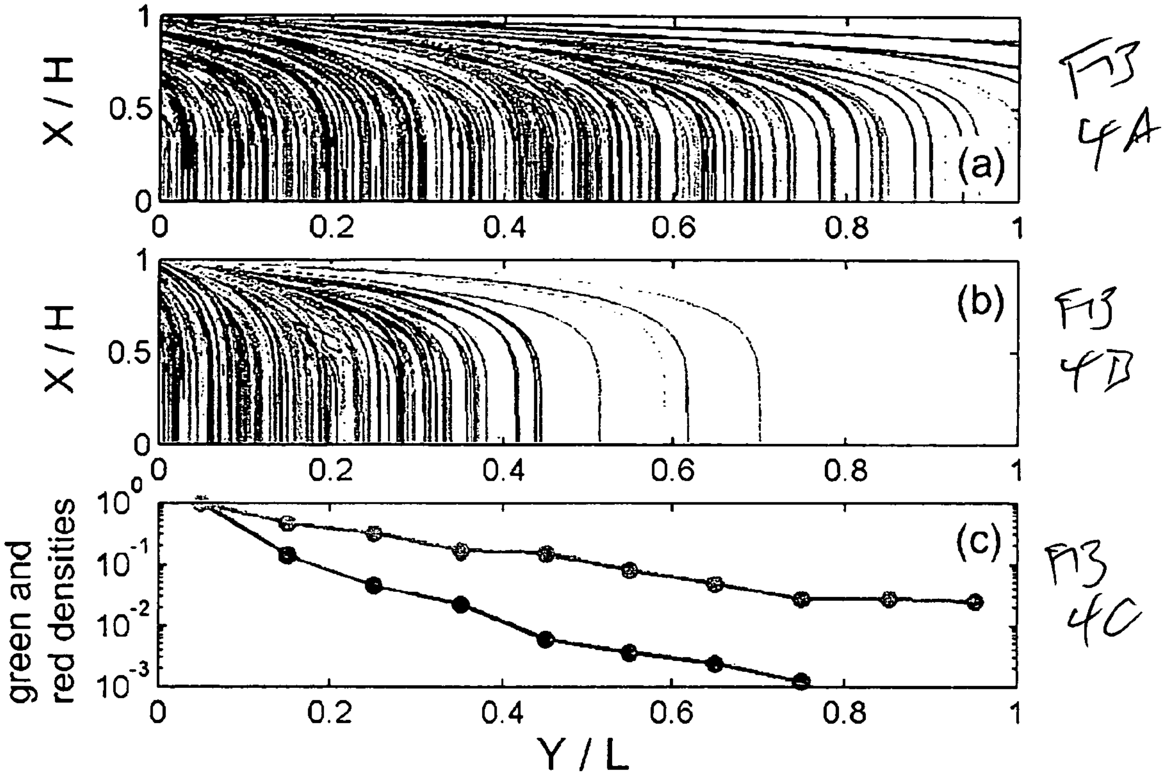
FIGS. 4A-4C show results of 3D Monte Carlo simulation of particle separation.

A range of values for the Clausius-Mossotti factor was used in the simulation in an effort to reproduce the experimental data plotted in FIG. 3C. FIGS. 4A-4C summarize results from a representative simulation using $\mathrm{Re}[\underline{K}]=0.5$ and with all other parameters set to the experimental conditions. FIGS. 4A and 4B show side views of sample trajectories for the smaller (0.5 μm diameter) and larger (1.0 μm) beads, respectively. Note that none of the larger particles are convected beyond y≈0.7 L. FIG. 4C, displaying normalized bead densities for the smaller (green) and larger (red) particles, indicates that excellent beneficiation of the smaller particles is possible under these experimental conditions. The simulation results fit the data best at $\mathrm{Re}[\underline{K}]\sim0.5$, which is consistent with expectations for polystyrene beads, given the uncertainties in the parameters and in the model.

While a preferred embodiment has been set forth above, those skilled in the art who have reviewed the present disclosure will readily appreciate that other embodiments can be realized within the scope of the present invention. For example, numerical values are illustrative rather than limiting, as are recitations of specific materials. Therefore, the present invention should be construed as limited only by the appended claims.

We claim:

1. A method for selective separation of particles which are suspended in a liquid medium and which differ in regard to a characteristic, the method composing:

(a) applying the liquid medium to a pair of electrodes;

(b) applying a voltage to the pair of electrodes to generate a non-uniform electric field in the liquid medium, the voltage comprising an alternating-current voltage with a frequency sufficiently high for the electric field to penetrate through the liquid medium; and (c) performing step (b) for a sufficient time that the liquid sample travels along the electrodes as a result of the voltage applied in step (b), with the particles which differ in regard to the characteristic having different spatial distributions along the electrodes.

2. The method of claim 1, further comprising (d) removing the voltage to cause the liquid sample to divide into droplets which are spaced along the electrodes.

3. The method of claim 1, wherein the electrodes are parallel electrodes.

4. The method of claim 3, wherein a dielectric material is disposed on the electrodes such that the dielectric material is between the electrodes and the liquid medium.

5. The method of claim 4, wherein a wetting control agent is disposed on the dielectric material such that the wetting control agent is disposed between the dielectric material and the liquid medium.

6. The method of claim 1, wherein the particles are biological particles.

7. The method of claim 6, wherein the biological particles are selected from the group consisting of cells, organelles, proteins, DNA, RNA, and combinations thereof.

8. The method of claim 7, wherein the biological particles are separated based on differences in dielectric properties.

9. The method of claim 1, wherein the characteristic comprises a size of the particles.

10. The method of claim 1, wherein the characteristic comprises a dielectric property of the particles.

11. A method for selective separation of particles which are suspended in a liquid medium and which differ in regard to a characteristic, the method comprising:

(a) applying the liquid medium to a pair of electrodes;

(b) applying a voltage to the pair of electrodes to generate a non-uniform electric field in the liquid medium, the voltage comprising an alternating-current voltage with a frequency sufficiently high for the electric field to penetrate through the liquid medium;

(c) performing step (b) for a sufficient time that the liquid sample travels along the electrodes, with the particles which differ in regard to the characteristic having different spatial distributions along the electrode; and (d) removing the voltage to cause the liquid sample to divide into droplets which are spaced along the electrodes.

12. The method of claim 11, wherein the electrodes are parallel electrodes.

13. The method of claim 12, wherein a dielectric material is disposed on the electrodes such that the dielectric material is between the electrodes and the liquid medium.

14. The method of claim 13, wherein a wetting control agent is disposed on the dielectric material such that the wetting control agent is disposed between the dielectric material and the liquid medium.

15. The method of claim 11, wherein the particles are biological particles.

16. The method of claim 15, wherein the biological particles are selected from the group consisting of cells, organelles, proteins, DNA, RNA, and combinations thereof.

17. The method of claim 16, wherein the biological particles are separated based on differences in dielectric properties.

18. The method of claim 11, wherein the characteristic comprises a size of the particles.

19. The method of claim 11, wherein the characteristic comprises a dielectric property of the particles.

* * * * *